US007809165B2

(12) United States Patent
Porikli

(10) Patent No.: US 7,809,165 B2
(45) Date of Patent: Oct. 5, 2010

(54) METHOD FOR GENERATING DISTANCE MAPS USING SCAN LINES

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 924 days.

(21) Appl. No.: 11/626,974

(22) Filed: Jan. 25, 2007

(65) Prior Publication Data

US 2008/0181519 A1    Jul. 31, 2008

(51) Int. Cl.
G06K 9/00     (2006.01)
(52) U.S. Cl. ..................................... 382/106
(58) Field of Classification Search ......... 345/656–658; 382/100, 104–107, 246; 348/61–65
See application file for complete search history.

(56) References Cited

OTHER PUBLICATIONS

D. Paglieroni, "A unified distance transform algorithm and architecture", Journal Machine Vision and Applications vol. 5, No. 1, Dec. 1992.*

Y. H. Lee, S. J. Horng, J. Seitzer, "Parallel Computation of the Euclidean Distance Transform on a Three-Dimensional Image Array," IEEE Transactions on Parallel and Distributed Systems archive, 14:3, 203-212, Mar. 2003.*

* cited by examiner

Primary Examiner—Samir A. Ahmed
Assistant Examiner—Atiba O Fitzpatrick
(74) Attorney, Agent, or Firm—Dirk Brinkman; Gene Vinokur

(57) ABSTRACT

A method generates a distance map from an image including a set of pixels arranged in a Euclidian n-space. The set of pixels includes a subset of background pixels and a subset of foreground pixels. The distance map stores a distance value for every corresponding background pixel to a nearest foreground pixel. A set of scan lines having different directions are defined. The scanning of the set of pixels along each scan lines is performed by moving from a current pixel to a next pixel. The scanning of each scan line includes: making the next pixel the current pixel; initializing a counter to zero when the current pixel is one of the foreground pixels and the next pixel is one of the background pixels; incrementing the counter by one when the next pixel is one of the background pixels; and assigning the counter as the distance corresponding to the current pixel if the current pixel is one of the background pixels, and repeating beginning with the making step.

18 Claims, 7 Drawing Sheets

100

Forward Scan

```
flag = no;
for i = i+1
    if l(p_i)=1
        flag = yes;
        c = 0; set counter
    else
        if flag = yes
            c = c + 1;
            if f(p_j) exists
                f(p_j) = min(c,f(p_j));
            else
                f(p_j) = c;
            end if
        end if
    end if
end for
```

*Fig. 3*

```
Backward Scan flag = no;
for i = i-1
    if l(p_i)=1
        flag = yes;
        c = 0; set counter
    else
        if flag = yes
            c = c + 1;
            if f(p_i) exists
                f(p_i) = min(c,f(p_i));
            end if
        end if
    end if
end for
```

*Fig. 4*

METHOD FOR GENERATING DISTANCE MAPS USING SCAN LINES

FIELD OF THE INVENTION

This invention relates generally to image processing, and more generally to generating distance maps from images.

BACKGROUND OF THE INVENTION

In image processing, computer graphics and other physical sciences, distance maps are frequently used. In one type of distance map, the distance map gives a distance from every background pixel in an image to a nearest foreground or object pixel. In a binary image, the most common type of object pixel that is used for the distance determination is a boundary pixel on a surface of the object, A. Rosenfeld, J. Pfaltz, "Distance Functions in Digital Pictures", Pattern Recognition, Vol 1, 1968, pp 33-61.

Distance maps have a central role in the comparison of binary images, particularly for images resulting from local features such as edge or corner detection. The distance map can also be used to obtain the medial axes of digital shapes.

There are various ways of generating distance maps, depending on which distance metric is used, and how local distance information is propagated. Distance metrics include the $L_1$, $L_2$, $L_\infty$, chamber transforms, see R. Haralick, L. Shapiro, "Computer and Robot Vision", Vol. 1, Addison-Wesley Publishing Company, Chapter 5, 1992. The 2 (Euclidean) distance is the most common.

Chamfer metrics result in an approximation to the circular form, usually as an 8-sided or 16-sided closest fit polygon, G. Borgefors, "Hierarchical chamfer matching: A parametric edge matching algorithm", IEEE Transactions on Pattern Analysis and Machine Intelligence, 10(6):849865, 1988.

There are other distance metrics that aim to make the distance computation robust to noise. In a Gaussian distance map, the distance at a pixel is proportional to a weighted sum of distances of that pixel to all object pixels, with the weights inversely proportional to the distances. Gaussian functions are used as the weights. The summation has an averaging effect and reduces the effect of noise. As the standard deviation of the Gaussian function increases, the effect of noise decreases. However, averaging also reduces local details.

Because determining the exact Euclidean distance is computationally intensive, some methods use a mask, which is 'swept' over the image to determine approximations, such as the city-block, chess-board, or chamfer distances, see Rosenfeld et al.

One intuitive but extremely inefficient way of generating distance maps is to perform multiple successive morphological 'erosion' operations with a suitable structuring element until all foreground regions of the image have been eroded away. If each pixel is labeled with the number of erosions that have been performed before the pixel 'disappears', then this is just the distance map. The shape of the structuring element determines the type of the distance metric. A square element results in the chess-board distance transform, a cross shaped element yields the city-block distance transform, and a disc shaped element approximates the Euclidean distance transform.

The time complexity of those prior art methods is linear in the number of pixels of the image, but does not yield the exact Euclidean distance, which is required for some applications. Another drawback of those methods is that they are hard to perform in parallel because previously determined results need to be propagated during the computation.

A survey of efficient 2D morphological erosion methods that decompose the structuring element and take advantage of parallel rastering is described by F., R. Lotufo, "Classification of the Distance Transformation Algorithms under the Mathematical Morphology Approach," XIII Brazilian Symposium on Computer Graphics and Image Processing, 2000.

A unified method that determines distance and a related nearest feature transform concurrently for arbitrary bit maps is described by D. Paglieroni, "A unified distance transform algorithm and architecture", Journal Machine Vision and Applications Volume 5, Number 1, December, 1992. That method has an efficient implementation on serial processors based on parallel row followed by parallel column scanning.

A linear-time method for solving a class of minimization problems involving a cost function with both local and spatial terms is described by P. Felzenszwalb and D. Huttenlocher, "Distance Transforms of Sampled Functions," Cornell Computing and Information Science, Technical Report, 2004. Those problems can be viewed as a generalization of classical distance transforms of binary images, where the binary image is replaced by an arbitrary sampled function.

Another recursive method requires column-wise half plane search followed by row-wise search to accelerate the Euclidean distance computation, Kolountzakis, K. Kutulakos, "Fast computation of the Euclidian distance maps for binary images," Information Processing Letters, v. 43 n. 4, p. 181-184, Sep. 28, 1992.

Another method implements the chess-board distance on parallel processors, Y. H. Lee, S. J. Horng, "Optimal computing the chessboard distance transform on parallel processing systems," Computer Vision and Image Understanding, v. 73 n. 3, p. 374-390, March 1999. That method was extended for Euclidean distance computation, Y. H. Lee, S. J. Horng, J. Seitzer, "Parallel Computation of the Euclidean Distance Transform on a Three-Dimensional Image Array," IEEE Transactions on Parallel and Distributed Systems archive, 14:3, 203-212, March 2003. There, they derive geometry relations and properties among parallel planes, and adapt a parallel method on an emulated exclusive read exclusive write parallel random access machine (EREW PRAM).

An asymptotically optimal method for determining the Euclidean distances for a two-dimensional binary image is described by H. Breu, J. Gil, D. Kirkpatrick, M. Werman, "Linear Time Euclidean Distance Algorithms," IEEE Transactions on Pattern Analysis and Machine Intelligence, vol. 17, no. 5, pp. 529-533, May, 1995. Their method is based on the construction and regular sampling of a Voronoi diagram with sites including the unit pixels in the image. They construct the Voronoi diagram where the diagram intersects the horizontal lines passing through the centers of the pixels. Computationally, their method requires linear time. On the other hand, the explicit Voronoi diagram construction requires additional memory of a size proportional to the image.

SUMMARY OF THE INVENTION

The embodiments of the invention provide methods for generating a distance map from an image. Prior art methods that perform an exhaustive search for the minimum distances are infeasible in larger images.

In contrast with conventional approaches, the embodiments of the invention obtain the minimum distances with no explicit distance determination by using scan line propagation.

A scan line is propagated over the image. Counts are incrementally assigned to image pixels while checking for objects pixel. As an advantage, the precision of the propagation method can be set according to available resources. Unlike most conventional methods, the computational load does not depend on the number of pixels in the image.

In particular, a method generates a distance map from an image including a set of pixels arranged in a Euclidian n-space. The set of pixels includes a subset of background pixels and a subset of foreground pixels. The distance map stores a distance value for every corresponding background pixel to a nearest foreground pixel. A set of scan lines having different directions are defined. The scanning of the set of pixels along each scan lines is performed by moving from a current pixel to a next pixel.

The scanning of each scan line includes: making the next pixel the current pixel; initializing a counter to zero when the current pixel is one of the foreground pixels and the next pixel is one of the background pixels;

incrementing the counter by one when the next pixel is one of the background pixels; and assigning the counter as the distance corresponding to the current pixel if the current pixel is one of the background pixels, and repeating beginning with the making step.

BRIEF DESCRIPTION OF THE DRAWINGS

FIGS. 3-4 are diagrams of pseudo code for the method of FIG. 1;

DETAILED DESCRIPTION OF THE PREFERRED EMBODIMENTS

Figure 1:
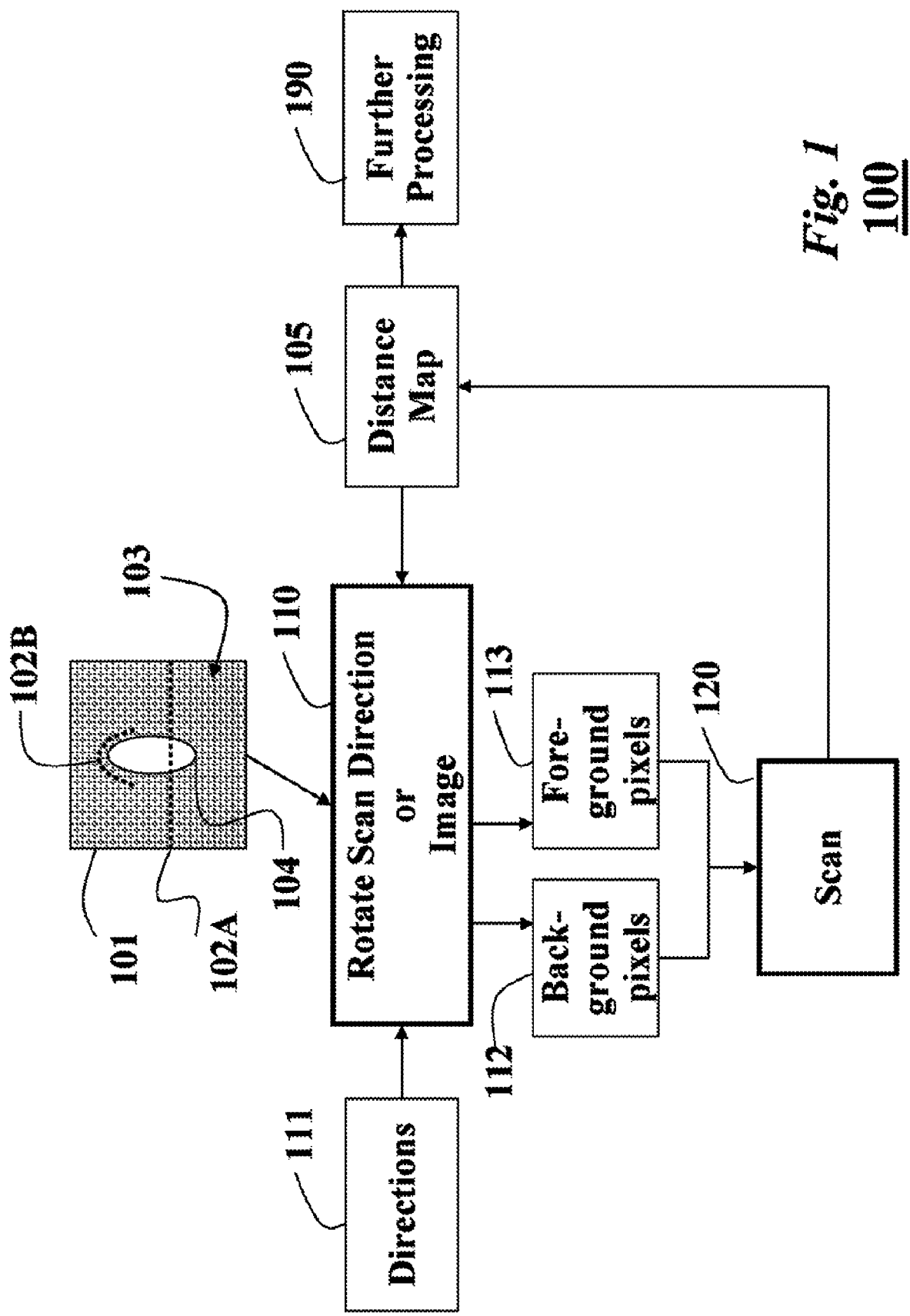
FIG. 1 is a block diagram of a method for generating a distance map using scan line propagation according to an embodiment of the invention.

FIG. 1 shows a method for generating a distance map 105 from an image I 101 according to an embodiment of the invention. The term 'image' is used broadly here, and can include 'images' of any type of electromagnetic radiation, or other physical fields, such as sound, gravitation, magnetism, and the like. In a preferred embodiment, the image is a binary image. The distance map 105 can be further processed by a number of applications. It should also be noted that the image can be multi-dimensional, and not necessarily limited to two-dimensions.

The distance map 105 is generated by propagating a scan line over the image 101. The scan lien can either be straight 102A to perform bi-directional 'raster' scanning, or the scanning can conform to a surface shape 102B of an object 104 to perform 'wave' propagation. In either case, the minimum distances for the distance map are found on scan lines that are normal (tangential) to the surface of the object.

The image 101 is composed of a set of pixels 103. Each pixel has an associated value, which can be a measure of some physical phenomena. In a preferred embodiment, the image 102 is a binary image, i.e., the pixel values are either 0 or 1.

In the image 101, the pixels 102 are conventionally arranged as a Euclidean grid forming rows and columns, i.e. I(x, y). Typically, the image is acquired of a scene including one or more objects. The invention can work for any number of objects in the scene. The background pixels in a subset P are called background pixels p 111, and the pixels in a subset Q, corresponding to an object are called object or foreground pixels q 112. The union of the subsets of background and foreground pixels forms the image 101.

If the scan line 102 is straight and extends across the entire image, the pixels are scanned in a "raster" scan order, first in a forward direction, and then in a backward direction, i.e., the scanning is bi-directional. If the scanning is according to the surface shape, the straight scan lines are normal the surface, and the scanning concurrently moves outwards from the object on all scan lines like a wave front.

As shown in FIG. 2A-2C, the scanning is done by either changing scan line directions 111, or rotating the image for each direction as shown in FIG. 2D. FIGS. 2A-2C shows directional changing by steps ±1 201, 1 and 1/√3 202, ±1 and ∓1 203. FIG. 2C shows rotating the image through various angles 304. 9. That is, the different directions are effected by determining vertical and horizontal index step values for a rotation angle and increasing pixel coordinate indices according to the step values when moving on along each scan line.

Scan Line Propagation

In one embodiment, the distance map is generated from an image (set of pixels) in a Euclidean n-space. The method can be extended to a formulation for high dimensional bounded Euclidean n-spaces, such as data volume of voxels.

A pixel p is in a background subset P 111 of pixels, and a pixel q is a foreground pixel in a subset Q 112. The set P has M pixels, and the set Q has N pixels. In a binary image, the background and object pixels have different intensity values, i.e., I(p)=0 and I(q)=1, and the union of all of the pixels constitutes the image 101.

A distance transform f, where f: G→ℜ, assigns a minimum distance to each background pixel as $$f(p) = \min_{q \in Q} d(p, q), \quad (1)$$

where d(p, q) is a measure of the distance between the background pixel p, and the nearest foreground or object pixel q.

In the case of a Euclidean distance, the distance metric is defined as $$d(p,q) = \|p,q\| = \sqrt{(x_p - x_q)^2 + (y_p - y_q)^2}. \quad (2)$$

To integrate local weight constraints, some methods use the following alternative definition $$f(p) = \min_{q \in Q} (d(p, q) + m(q)), \quad (3)$$

where m(q) is a membership function. In other words, this formulation finds a pixel q that is close to p and also has a small m(q).

A nearest feature transform of I, which assigns each pixel to the nearest pixel such as $$n(p) = \arg\min_{q \in Q} d(p, q) \quad (4)$$

can also be obtained after the distance determination.

Instead of determining and finding minimum distances of all M background pixels to all N object pixels, i.e., a total of MN distance computations and MN comparisons, we repeat simple increment operations. In fact, no explicit distances are ever determined.

The invention takes advantage of the subtle fact that for two adjacent background pixels $p_i$, $p_{i+1}$, the associated minimum distances is either $$f(p_i) < f(p_{i+1}), \text{ or } f(p_i) > f(p_{i+1})$$

on a straight line passing through three pixels, i.e., an object pixel q, and background pixels $p_i$, $p_{i+1}$. Note that the distances can never be equal.

Scanning Method

Figure 5:
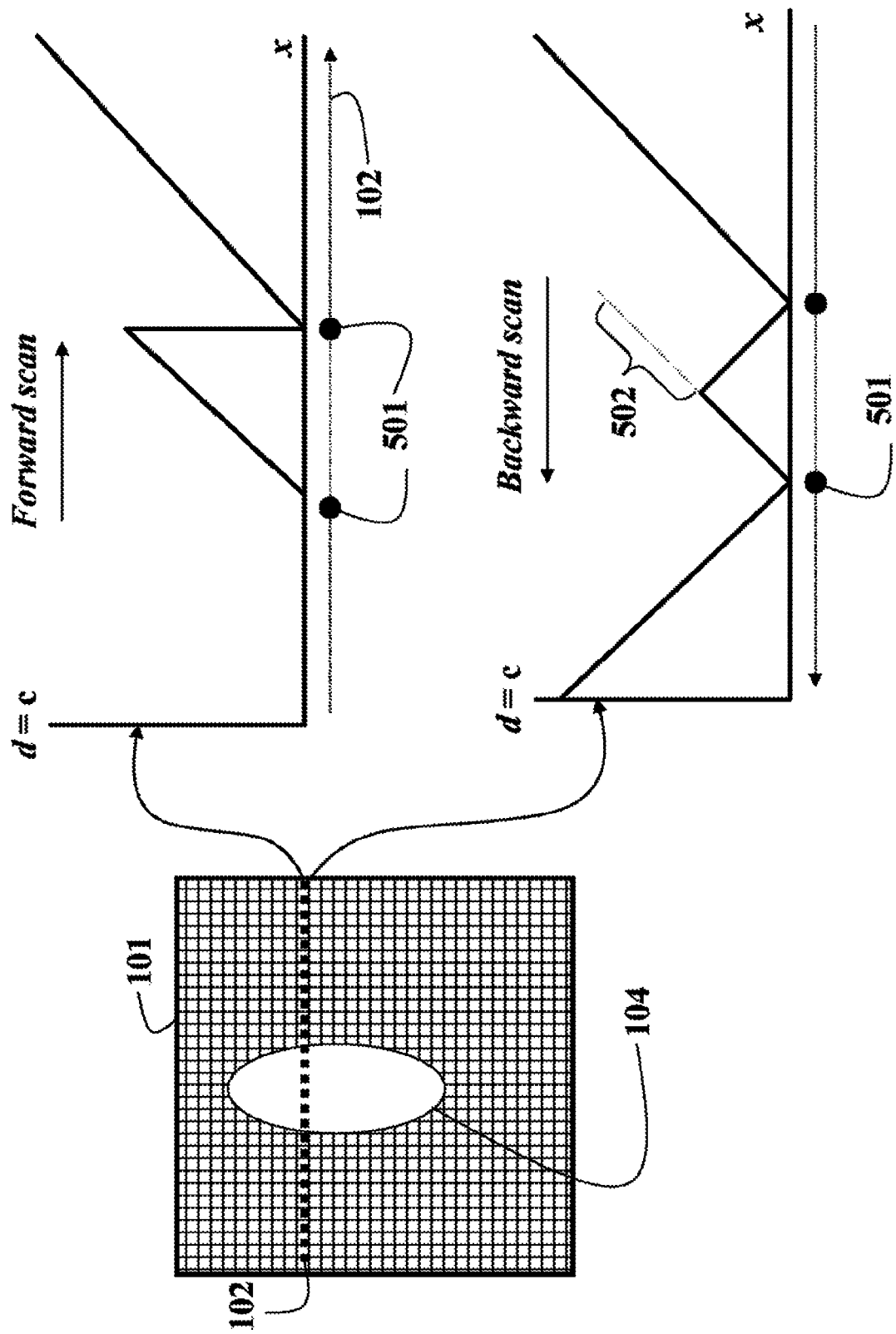
FIG. 5 is a diagram of scan line propagation for the method of FIG. 1.

FIGS. 3 and 4 show pseudo code for the bi-directional scanning of the method of FIG. 1, and FIG. 5 shows the bi-directional scanning diagrammatically. In FIG. 5, the vertical axis is distance (d) corresponding to counter values c, and the horizontal axis movement along the scan line (x), which assigns distance values to the pixels. The dots 501 indicate foreground-background transitions, i.e., boundary pixels. That is, the boundary pixels are subset of the foreground pixels.

FIG. 3 shows the pseudo code for the scanning along the scan line in the forward direction. A flag to "no", and iteratively move along a scan line in a forward direction (i=i+1), and examine each pixel to determine whether it is an foreground pixel or background pixel. If the flag is "yes" and the current pixel i is a foreground pixel, then set a counter c to zero. If the pixel is a background pixel, and the flag is "yes", then increment the counter c=c+1, and set the pixel distance to the counter, $f(p_i)$.

FIG. 4 shows the pseudo code for scanning in the backward direction, which mimic the forward scanning. The reason two directions are used is that the scanning can only determine minimum distances after having passed over an object pixel. For example, if the scan line is horizontal, the forward scan determines distances to the right of an object, and the backward scan distances to the left. Consequently, the scanning is bi-directional, as shown in FIG. 5.

Figure 2:
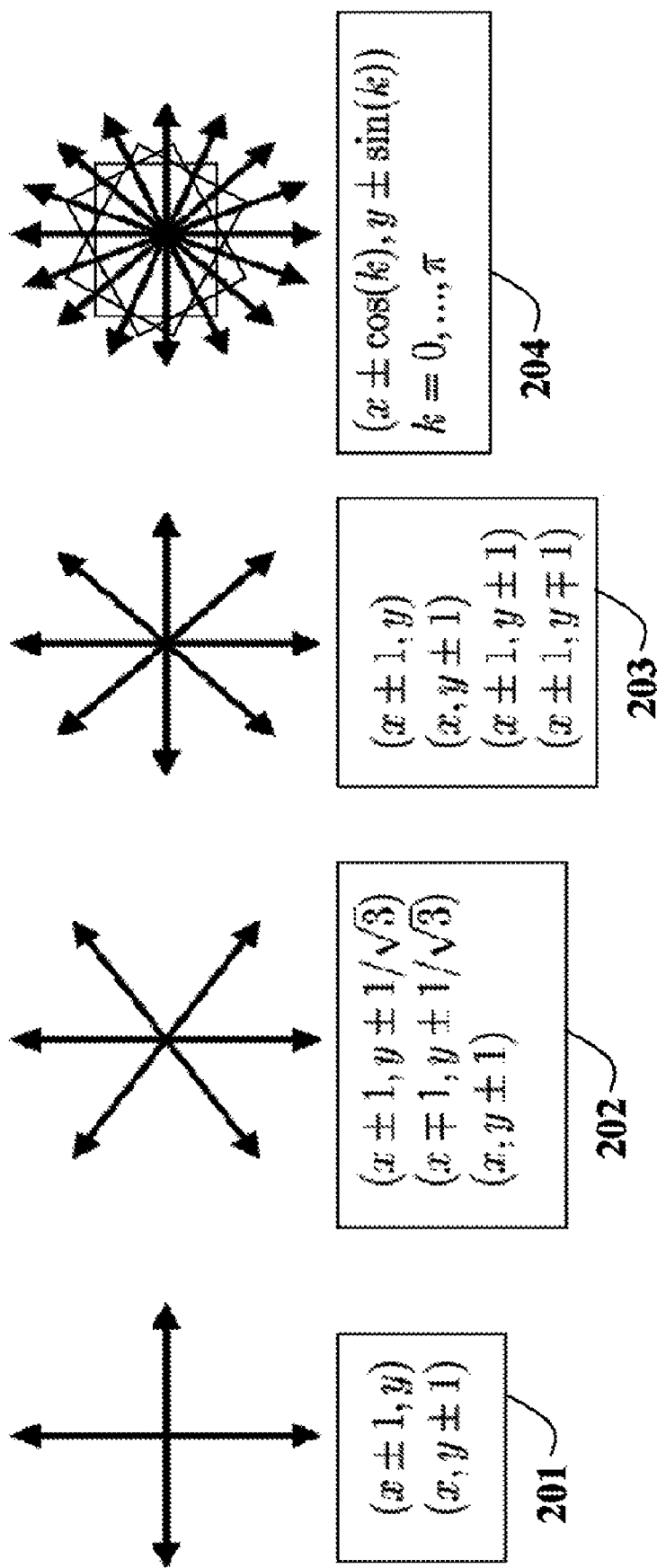
FIGS. 2A-2D are diagrams of rotating directions according to an embodiment of the invention.

We process the image 101 by applying the above scan line propagation. Note that scanning each line independently only produces correct minimum distances if the scanning line is normal to a surface of the object when transitioning from foreground pixels to background pixels. Hence, each different normal direction on the surface of the object surface requires an additional dual-scan propagation in that normal direction. Therefore as shown in FIG. 2, the dual scan propagation is applied in multiple directions 111 as shown in FIG. 2 by either rotating the scan line 102 or the image 101, retaining previous distance value in the distance map 105 for minimum distance determinations.

In the case the number of the scan lines is less than the number of the normal directions on the surface, e.g., due to contour changes of the shape of the surface of the object, approximation error can happens. However in practice, there are limited number of normal directions due to the rasterization of the surface and the confined size of images.

We emphasize that each additional direction refines the estimated distance values. Being able to improve the quality of the estimations with respect to the available computational power is essential in computationally constrained applications.

In contrast to most conventional approaches, the bi-directional scan line propagation in multiple directions is not adversely effected by an increasing number of the object pixels. As the number of object pixels becomes greater, i.e., their density in the data space grows, the process becomes more accurate because the average minimum distance statistically is expected to decrease. This is not the case for methods that propagate local minima, or determine distances for all pixels.

Another important advantage of our method is that scanning can be performed for multiple scan lines in parallel. In other words, the bidirectional scan line propagation can easily be implemented in parallel processors or with parallel programming.

Because the propagation results always update the same distance map 105, the bi-directional scan method does not require any additional memory space, when compared with conventional methods.

Wave Propagation

Figure 6:
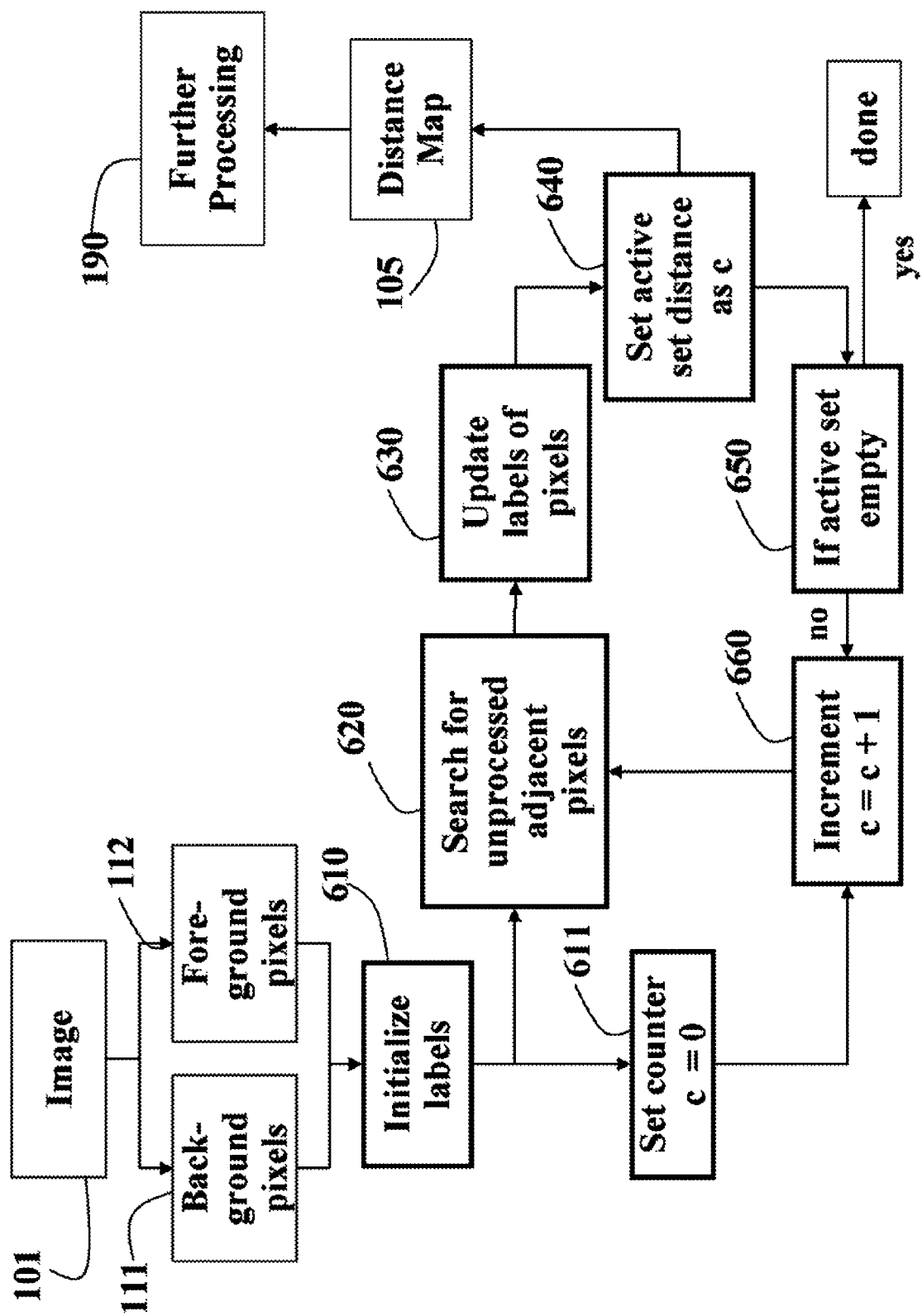
FIG. 6 is a block diagram of a method for generating a distance map using scan line propagation according to another embodiment of the invention.
Figure 7:
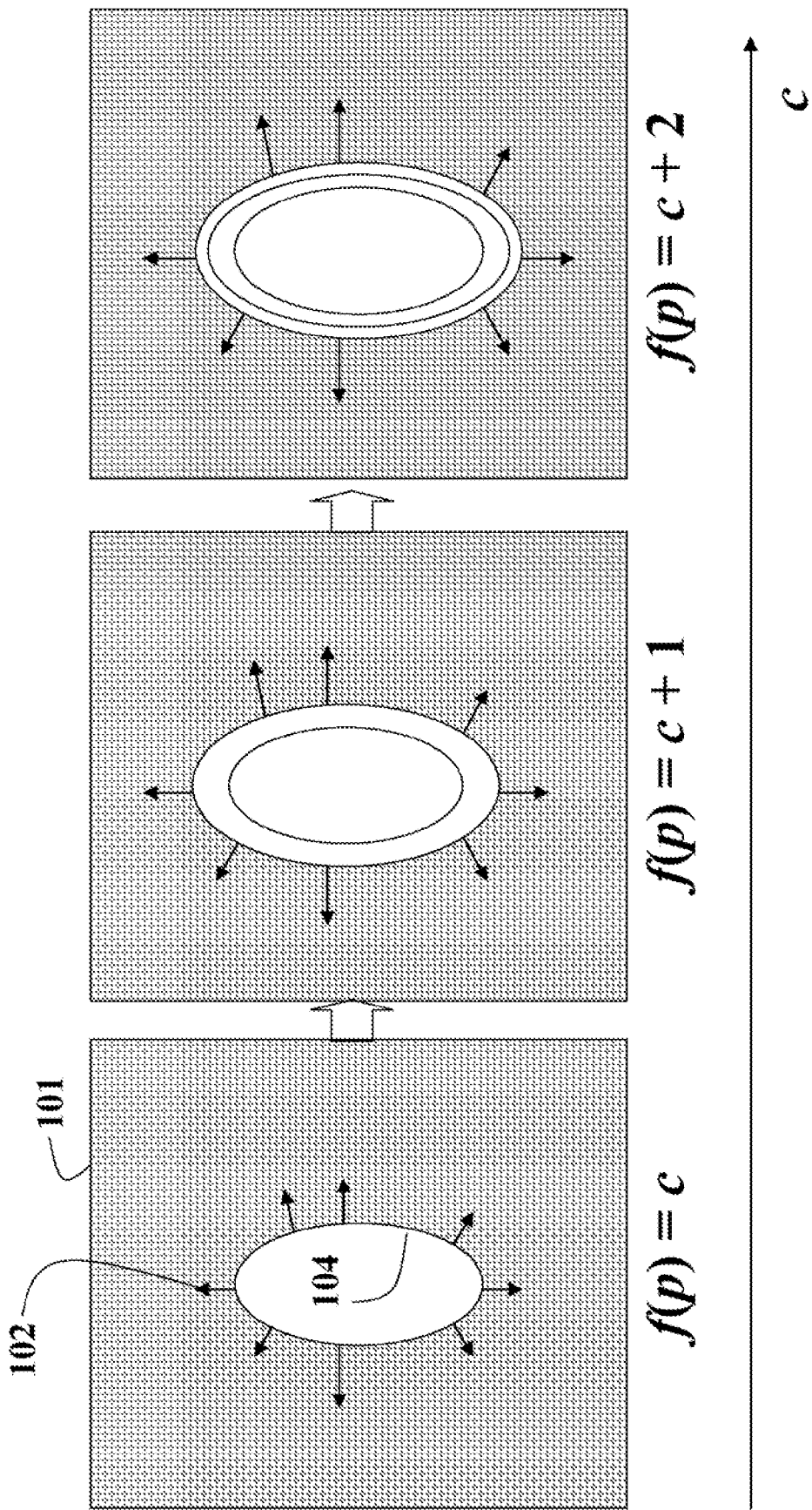
FIG. 7 is a diagram of scan line propagation for the method of FIG. 6.

As shown in FIGS. 6 and 7 for an alternative embodiment of our invention, the image 101 is processed with scan lines 102 that are all approximately normal to the surface of the object 104. Furthermore, the scan lines start at the object surface or one of the boundary pixels. Thus, there is no need to scan in both direction. Furthermore, each normal scan line is scanned forward in parallel, thus the scan effectively moves out from the object like a wave as shown in the Figures. Therefore, we call this wave propagation.

Usually, such an approach determines surface curvature and requires sub-pixel accuracy. A well known wave propagation technique is a fast marching of Eikonal equations as described by F. Porikli, "Automatic image segmentation by Wave Propagation," Proceedings of IS&T/SPIE Symposium or Electronic Imaging, San Jose, 2004. In that method, a set of initial pixels are selected iteratively. For each initial pixel, a wave-front is propagated. The 'speed' of the wave-front at a pixel is determined by the underlying image gradient information. If the gradient is large, the speed is slow, and fast if the gradient is small. For each image pixel, the wave-arrival 'times' are determined. Then, each image is assigned to the first arriving wave's initial pixel to segment the image. That method requires sub-pixel accuracy, and local curvature. In the distance map according to the invention, we determine the distances without using any curvature information, gradients, sub-pixel accuracy.

We describe a much simpler implementation that does not depend on surface information. We use three labels for pixels 112-113, processed, active, and unprocessed, to group the pixels at each processing step. We initialize 610 the labels as follows, and set a counter c=0.

We find the boundary pixels of the object 104, and label the boundary pixels as a set of active pixels 610, and set the distance for the boundary pixels to zero, i.e., f(p)=c=0. The pixels that we do not need to determine the minimum distances, e.g., the pixels inside the object surface, etc., are labeled as processed pixels. Then, we start propagating the wave front using the active set of pixels, until no pixels remains in the active set.

We search 620 the unprocessed immediately adjacent pixels of the pixels that are in the active set, and construct a next set of active pixels from those pixels. We update 630 the labels accordingly. Then, we set 640 the distance for the current active set of pixels equal to the counter c, f(p)=c. If the active set is not empty 650, we continue by incrementing 660 the counter c, and searching 620 for more unprocessed pixels.

Similar to bi-directional line scan, this method is fast and effectively approximates the city-block or chess-board distances, depending on a connectivity rule which is used to determine the next adjacent pixel to be processed. Using the well known 4-neighbor connectivity gives the city-block distance, and using the similar 8-neighborhood imposes the chess-board distance. The determination of the distances is linear time and does not depend on the number of object pixels.

There are major differences between the morphological approaches described by Lotufo et al. and our wave front propagation method. For instance, in morphology all of the pixels are processed at each step by comparing the local neighborhood to a given structure element, which is a 'clump' of two or more pixels. In our method we only process a small set of active set pixels, thus, out method is exceedingly faster. The step size in morphology is strictly dictated by the shape of the structure element. In the wave-front propagation case, the step size is exactly one pixel within the 4 or 8 connectivity of a pixel, and not a clump of multiple pixels.

EFFECT OF THE INVENTION

We compared the computational load of the our methods with the conventional accepted distance computation as described by Breu, and level-set based propagation as described by Porikli.

We tested several binary images with changing number of object pixels. We observed that both of the proposed methods reduce the average computation times, almost to one third of the current state-of-art implementation for distance transform.

The dual-scan propagation approximates the Euclidean distance. The accuracy improves as the resolution of the scanning directions increases, which is also linearly reflected to the computational load. We observed insignificant difference for 512×512 images using 12 to 24 orientations.

The wave-front propagation is the fastest method we tested. Using the 4-connectivity in active set update imposes the city-block distance as shown in FIG. 4.

The chess-board distance is obtained when the connectivity constraint is enlarged to the nearest 8 neighboring pixels. As we explained before, the dual-scan propagation can be effectively implemented using parallel programming unlike the sequential wave-front propagation. Besides, the wave-front method requires a mask of labels, which doubles the memory imprint. The above described method can be about four to five times better than conventional distance transforms.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for generating a distance map from an image, the method comprising the steps of:
    arranging a set of pixels in the image in a Euclidian n-space, the set of pixels including a subset of background pixels and a subset of foreground pixels;
    storing the distance map, wherein the distance map includes a distance value for every corresponding background pixel to a nearest foreground pixel;
    defining a set of scan lines having different directions, in which the different directions are effected by rotating the image; and
    scanning the set of pixel along each scan lines by moving from a current pixel to a next pixel along the scan line, the scanning for each scan line further comprising the steps of:
    making the next pixel the current pixel;
    initializing a counter to zero when the current pixel is one of the foreground pixels;
    incrementing the counter by one when the current pixel is one of the background pixels only if the counter has been initialized; and
    assigning the counter as the distance corresponding to the current pixel if the current pixel is one of the background pixels, and repeating beginning with the making step.

2. The method of claim 1, in which the image is a binary image.

3. The method of claim 1, in which each scan line extends across the entire image.

4. The method of claim 1, in which the scan line is scanned in a forward direction and a backward direction.

5. The method of claim 1, in which the current pixel has a previously assigned distance, and the assigning only assigns the counter to the current pixel if the distance is less than a previously assigned distance.

6. The method of claim 1, in which the pixel indicates a measure of a physical phenomenon.

7. The method of claim 1, in which the data is volumetric data in 3D Euclidean space.

8. The method of claim 1, in which the different directions are effected by determining vertical and horizontal index step values for a rotation angle and increasing pixel coordinate indices according to the step values when moving on along each scan line.

9. The method of claim 1, in which the set of scan lines are processed in parallel.

10. The method of claim 1, in which the making step is performed concurrently for each scan line.

11. The method of claim 10, in which each pixel processed by the making step is not processed again.

12. The method of claim 10, in which the subset of foreground pixels includes a subset of boundary pixels defining a surface shape of the foreground pixels, and there is one scan line for each boundary pixel, and the scanning is normal to the surface shape and begins at the boundary pixels.

13. The method of claim 1, in which the making step is performed concurrently for each scan line, and in which the subset of foreground pixels includes a subset of boundary pixels defining a surface shape of the foreground pixels, and there is one scan line for each boundary pixel, and the scanning is normal to the surface shape, and the current pixels of the set of scan lines form a wave front moving outward from the boundary pixels.

14. The method of claim 1, in which the scanning terminates at an edge of the image.

15. The method of claim 1, in which the next pixel is determined according to a connectivity rule.

16. The method of claim 15, in which the connectivity rule uses a 4-neighbor connectivity, and the distance is a city-block distance.

17. The method of claim 15, in which the connectivity rule uses an 8-neighbor connectivity, and the distance is a chess-board distance.

18. The method of claim 12, in which the subset of foreground pixels are all boundary pixels.

* * * * *